US008847103B2

(12) United States Patent
Retnaswamy

(10) Patent No.: US 8,847,103 B2
(45) Date of Patent: Sep. 30, 2014

(54) ELECTRONIC PRESSURE REGULATOR

(75) Inventor: Ashok V. Retnaswamy, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 754 days.

(21) Appl. No.: 13/090,032

(22) Filed: Apr. 19, 2011

(65) Prior Publication Data
US 2012/0012567 A1 Jan. 19, 2012

Related U.S. Application Data

(60) Provisional application No. 61/365,249, filed on Jul. 16, 2010.

(51) Int. Cl.
B23K 10/00 (2006.01)
B23K 9/013 (2006.01)

(52) U.S. Cl.
CPC .............. B23K 10/00 (2013.01); B23K 9/013 (2013.01)
USPC ............ 219/121.55; 219/121.54; 219/121.57; 219/121.59

(58) Field of Classification Search
CPC ........ B23K 10/00; B23K 9/013; B23K 9/067; B23K 9/0053; H05K 1/32; H05H 1/36; H05H 1/3405
USPC ............. 219/121.55, 121.39, 121.44, 121.59, 219/121.57, 121.54
See application file for complete search history.

(56) References Cited

U.S. PATENT DOCUMENTS

| 4,331,026 | A |   | 5/1982 | Howard et al. |
| 4,903,578 | A |   | 2/1990 | Terp |
| 5,132,512 | A | * | 7/1992 | Sanders et al. ............. 219/121.5 |
| 5,207,192 | A |   | 5/1993 | Smith |
| 5,317,126 | A | * | 5/1994 | Couch et al. ............. 219/121.51 |
| 5,520,652 | A |   | 5/1996 | Peterson |
| 5,711,582 | A |   | 1/1998 | Koike |
| 5,760,363 | A | * | 6/1998 | Hackett et al. ........... 219/121.44 |
| 5,796,067 | A | * | 8/1998 | Enyedy et al. ........... 219/121.52 |
| 6,056,372 | A |   | 5/2000 | Kamei et al. |
| 6,584,999 | B2 |   | 7/2003 | Inayama et al. |
| 2006/0158029 | A1 |   | 7/2006 | Shaw et al. |
| 2007/0079594 | A1 |   | 4/2007 | Firey |
| 2008/0023073 | A1 |   | 1/2008 | Askew |
| 2010/0258192 | A1 |   | 10/2010 | Schaufler |

FOREIGN PATENT DOCUMENTS

JP 11-344147 12/1999

* cited by examiner

Primary Examiner — Mark Paschall
(74) Attorney, Agent, or Firm — Proskauer Rose LLP

(57) ABSTRACT

A system and method for regulating a gas flow of a plasma arc system. The system having a gas regulator that control gas flow from a gas source to the plasma torch system, a pilot input valve to fill a pilot chamber and a pilot dump valve to evacuate the pilot chamber, the pilot chamber mechanically coupled to the gas regulator through a pressure actuator, such that the gas flow pressure through the regulator is controlled using the pressure actuator and based on the pressure in the pilot chamber.

14 Claims, 4 Drawing Sheets

ELECTRONIC PRESSURE REGULATOR

CROSS REFERENCE TO RELATED APPLICATIONS

This application claims the benefit of and priority to U.S. Provisional Application Ser. No. 61/365,249 filed Jul. 16, 2010, the disclosure of which is incorporated herein by reference in its entirety.

BACKGROUND

A gas pressure regulator is an integral part of any plasma cutting system. Typically, the gas handling subsystem in a manual plasma arc torch cutting system includes a manually operated regulator, a three-way valve and some form of a pressure indicator, typically a dial gauge or an indication based on readings from a pressure sensor.

Depending upon the type of cutting process and the type of torch being used, the user typically sets the pressure of the gas manually using the knob on a manual regulator. This involves the user of the torch looking up in the operator's manual the recommended gas pressure for the type of cutting process and the type of torch being used, then setting the system to 'gas test' mode and adjusting the pressure using the manual regulator. This process is inefficient and time-consuming, and can be a source of error in preparing the system to cut a workpiece.

In some systems, a preset (i.e., fixed, non-adjustable) regulator is used to remove the burden of setting gas pressure from the user. Although this approach has benefits, it prohibits the user from customizing or fine tuning the gas pressure based on the application and restricts the cutting capabilities of the plasma cutting system.

SUMMARY

What is required is an automatic gas pressure regulation system that automatically sets the pressure depending upon the type of cutting process and torch the user selects, thus relieving the operator from a major 'system preparation' burden. Such a system can allow the operator to customize the gas pressure, if required. Also, it can be beneficial for such a system to integrate the functions of the three-way valve and the pressure sensor.

In one aspect, the technology can include a plasma torch regulator having a pilot chamber with a pilot input valve and a pilot dump valve, a gas regulator having a gas input port and a gas outlet port, and a dump valve. The plasma torch regulator can also include a pressure actuator that mechanically links the pilot chamber and gas regulator such that a pilot pressure in the pilot chamber activates the pressure actuator and determines an outlet gas flow that the gas regulator allows to flow through the gas outlet port to a plasma torch system, and a dump actuator that mechanically links the pilot chamber and the dump valve such that when the pilot pressure in the pilot chamber less than a predetermined value, the dump valve is opened to exhaust the outlet gas flow to the plasma torch system.

In a further aspect, the technology can include a method of regulating a gas flow of a plasma arc system. The plasma arc system can include a gas regulator that control gas flow from a gas source to the plasma torch system, a pilot input valve to fill a pilot chamber and a pilot dump valve to evacuate the pilot chamber, and the pilot chamber mechanically coupled to the gas regulator through a pressure actuator. The pilot chamber can be filled by opening the pilot input valve to raise the pressure level in the pilot chamber such that the pilot pressure in the pilot chamber is controlled by opening and closing the pilot input valve and the pilot dump valve, and a gas flow pressure is controlled through the gas regulator to the plasma torch system using the pressure actuator based on the pressure in the pilot chamber. Further, a pilot dump valve can be opened to evacuate the pilot chamber and decrease the gas flow to the plasma torch system when loss of power is detected.

In another aspect, the technology can include a method of regulating a gas flow of a plasma torch system having a gas regulator that controls gas flow from a gas source to the plasma torch system, a pilot input valve to fill a pilot chamber and a pilot dump valve to evacuate the pilot chamber wherein the gas regulator is mechanically coupled to the pilot chamber through a pressure actuator, a dump valve that allows for exhaust of the gas in the plasma torch system, the dump valve mechanically coupled to the pilot chamber through a dump actuator. The pilot chamber can be filled by opening the pilot input valve to raise the pilot pressure in the pilot chamber, and the pilot pressure in the pilot chamber can be controlled by opening and closing the pilot input valve and the pilot dump valve. Further, a gas flow pressure of the gas flow through the gas regulator to the plasma torch system can be controlled using the pressure actuator based on the pressure in the pilot chamber, and a pressure difference between a pilot pressure in the pilot chamber and the gas flow pressure is measured. Finally, an exhaust gas flow from the plasma torch through the dump valve can be controlled using the dump actuator when the pressure difference between the pilot pressure and the gas flow pressure is greater than a predetermined value.

An additional aspect of the technology includes a plasma torch regulator. The plasma torch regulator can include a pilot chamber with a pilot input valve and a pilot dump valve, a gas regulator, a dump valve, and a pressure actuator mechanism. The pilot input valve can have a closed position that inhibits gas flow through a pilot valve body and an open position that allows gas flow through the pilot valve body such that the pilot input valve can be configured to be in the closed position in the absence of a signal. Further, the pilot dump valve can also have a closed position that inhibits gas flow through a pilot dump valve body and an open position that allows gas flow through the pilot dump valve body, such that the pilot dump valve can be configured to be in the open position in the absence of a signal. The plasma torch gas regulator can also include a gas regulator having a gas input port and a gas outlet port. The plasma torch gas regulator can also include a dump valve having an exhaust port. The dump valve can have a closed position that inhibits gas flow from the plasma gas torch through a dump valve body and an open position that allows gas flow from the plasma torch through the dump valve body, in some embodiments the pilot dump valve can be configured to be in the open position in the absence of a signal. The plasma torch regulator can also include a pressure actuator mechanism that mechanically links the pilot chamber and the gas regulator such that the pressure actuator mechanism reacts to a pilot pressure in the pilot chamber and establishes an outlet gas flow that the gas regulator allows to flow through the gas outlet port to a plasma torch system. The pressure actuator mechanism can also mechanically link the pilot chamber and the dump valve such that when the pilot pressure in the pilot chamber is less than a predetermined value, the dump valve is opened to exhaust the outlet gas flow out through the exhaust port.

Any of the aspects above can include one or more of the following features. The pressure actuator and the dump actuator can be a diaphragm or a piston, the pilot input valve and the pilot dump valve can be proportional control valves, and the pilot input valve and the pilot dump valve can be on/off valves. In some embodiments, the pilot fill valve and the pilot dump valve can be opened and closed based on controlled signals from a control board. In some embodiments the control board receives feedback signals from a sensor that measures the outlet gas flow.

Any of the aspects above can include one or more of the following features. In some embodiments, the pilot chamber can be filled by closing the dump valve. The gas flow pressure to the plasma torch system can be measured through a pressure sensor. And the pilot pressure can be controlled by using the measured gas flow pressure to adjust the pilot pressure to a desired value.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

The performance requirements for the plasma pressure regulator systems can be separated into three sets of requirements, those needed for filling, regulating, and exhausting ('dumping') the gas.

Filling requires the ability to rapidly fill the torch line with gas and bring the pressure at the torch up at a rate sufficient to make the contact start mechanism function. For example, some systems require peak flows in excess of about 750 scfh. Regulation requires tight control of pressure (+/−about 1 psi) at flows that can vary between about 200 and about 500 scfh and outlet pressures that can vary between about 40 and about 90 psi. 'Dumping' requires extremely high flow rates of gas, in the reverse direction, to depressurize the lead and torch to enable rapid refire. For example, some systems require flows in excess of about 1000 scfh.

Pressure flow control into a plasma torch can be achieved using a pneumatic pressure relay is similar to a conventional manually adjusted pressure regulator. In a conventional pressure regulator, the pressure is usually regulated by a mechanism that achieves a force balance between two sides of a pressure actuator. A knob and spring mechanism can be used to set the tension and/or pressure on one side of the pressure actuator, and the regulating mechanism controls the pressure on the opposite side by operation of a needle and seat arrangement, or other variable flow arrangement.

Figure 1:
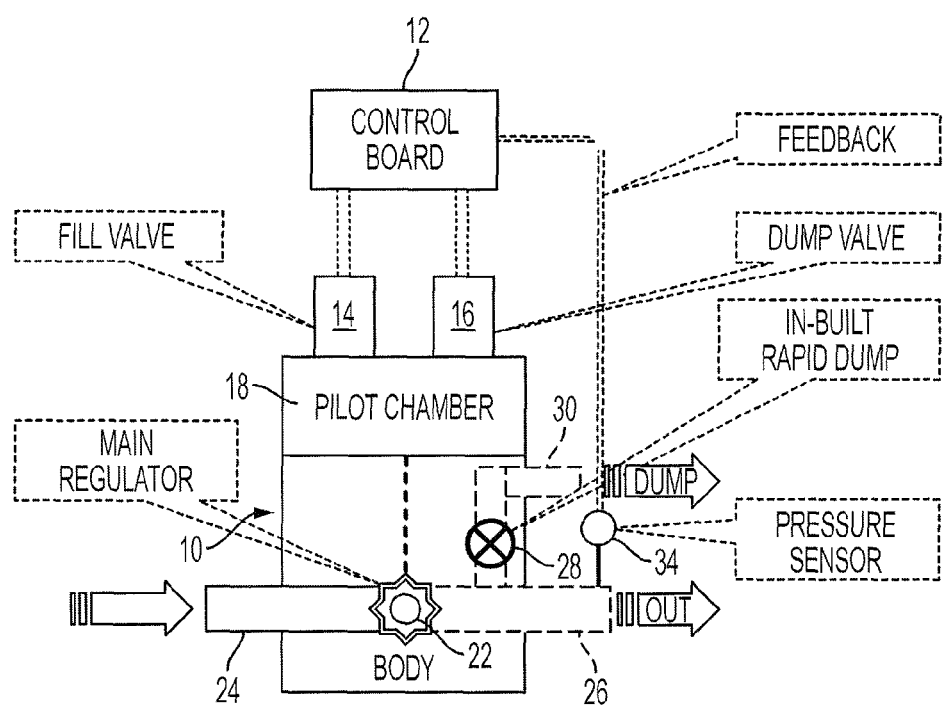
FIG. 1 shows an embodiment of a pressure regulator for use with a plasma torch system that implements a pneumatic relay system.

In some embodiments, a pneumatic relay can be used to control the regulator that adjusts the pressure flow to the plasma torch and a small pilot chamber can replace the knob and spring arrangement. FIG. 1, for example, shows a pneumatic pressure relay used in conjunction with a plasma torch pressure regulator 10. In FIG. 1, a pilot fill valve 14 and a pilot dump valve 16 control the pressure in a pilot chamber 18, thereby setting the pressure on one side of the pressure actuator 20. The pilot fill valve can also be referred to as a pilot input valve. The valves can be any combination of on/off or proportional valves, with or without orifices. The pilot volume or chamber can be small compared to the flow rate input. Using a small control volume can result in reaching an optimal pressure in about 10 to about 20 msec. (as compared to about 1-2 seconds as required by the knob and spring arrangement). The pilot input valve can have a closed position that inhibits gas flow through a pilot valve body and an open position that allows gas flow through the pilot valve body. Further, the pilot dump valve can also have a closed position that inhibits gas flow through a pilot dump valve body and an open position that allows gas flow through the pilot dump valve body.

In some embodiments, the pilot fill valve 14 and the pilot dump valve can be controlled by a control board 12. The control board 12 can be in communication with a sensor (not shown) that monitors the output pressure of the gas flowing to the plasma torch. The control board can then utilize preloaded software to control the opening and closing of the pilot fill valves and pilot dump valves to adjust the pressure in the pilot chamber, thereby affecting the opening and closing of the pressure regulator 22. In some embodiments, the pilot input valve can be configured to be in the closed position in the absence of a signal from the control board. Similarly, in some embodiments the pilot dump valve can be configured to be in the open position in the absence of a signal from the control board. In these situations, the lack of a signal can be cause by the control board intending the pilot input valve to be in a closed positions or the pilot dump valve to be in an open position; or in some embodiments, the lack of signal is because the control board has lost power momentarily or has been powered-off by the user.

In some embodiments, controlling the pressure in the pilot chamber can be achieved using different means, for example, (i) 2 on/off pilot solenoid valves; (ii) 3 or more on/off pilot solenoid valves; (iii) 2 or more proportional valves; (iv) a single three-way on/off pilot valve; (v) a single three-way proportional valve; or (vi) a combination of one or more proportional and on/off valves.

For example, one approach to control the pressure in the pilot chamber can be achieved using (i) 2 proportional valves, one to fill the chamber and the other to vent and (ii) 2 on/off pilot solenoid valves, one to fill the chamber and the other to vent.

A pressure actuator 20 can be positioned between the pilot chamber 18 and the pressure regulator 22. The pressure actuator 20 controls the pressure regulator 22 based on a pressure in the pilot chamber 18. As the pressure in the pilot chamber 18 increase the pressure actuator 20 opens or closes the pressure regulator 22, thereby controlling the gas flow pressure than enters the regulator through the input 24 and exits through the output 26. In some embodiments, the pressure actuator can be a diaphragm or a piston. In some embodiments, there is more than one pressure actuator, linked mechanically to transmit the force between them. There can also be differences in the areas and/or forces on the different sides, allowing for different ratios (e.g., gains) between the control pilot chamber pressure and the outlet pressure.

To enable higher performance of the fill and dump functions, additional mechanisms that aid or enhance the flow during these operating regimes can be added. For example, the dump function can be enhanced with a secondary pneumatically or mechanically driven mechanism that enhances the flow rate of gas during the dump regime (i.e., a secondary dump valve). For example, FIG. 1 shows a secondary dump valve 28 that can be opened to quickly exhaust a plasma torch gas line through a dump outlet 30.

Figure 2:
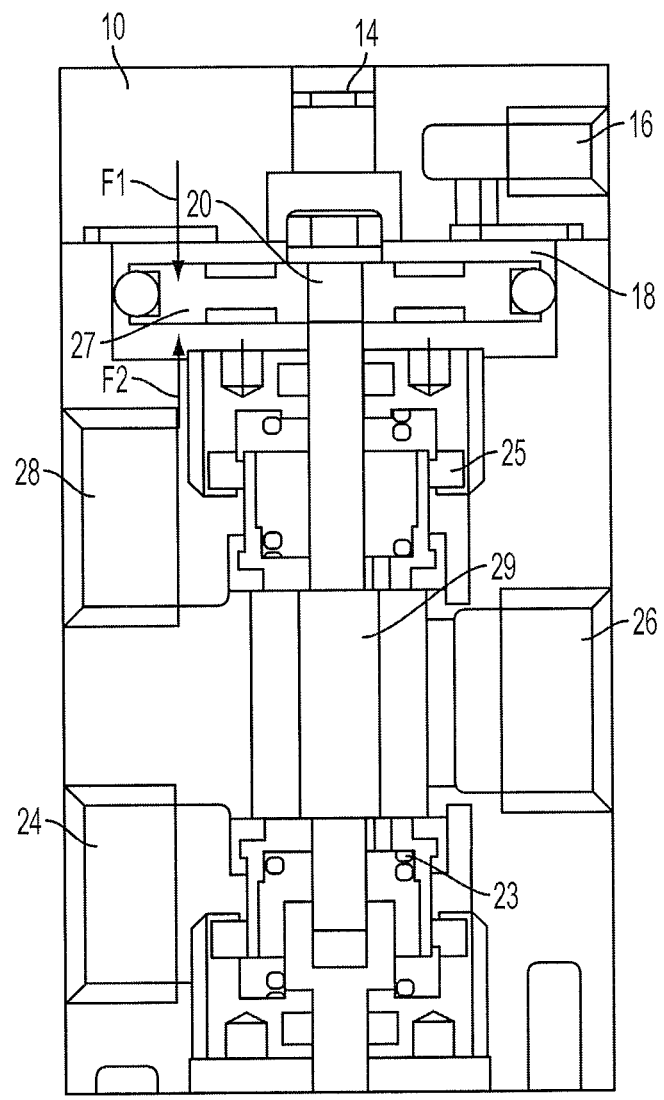
FIG. 2 shows an embodiment of a pressure regulator where the pressure actuator controls the gas regulator and the dump valve.

The technology can also include a plasma torch regulator 10, shown in FIG. 2. The plasma torch regulator 10 utilizes a single pressure actuator 20 that mechanically links the pilot chamber 18 and the gas regulator 23 such that the pressure actuator mechanism reacts to a pilot pressure in the pilot chamber 18 and establishes an outlet gas flow that the gas regulator allows to flow through the gas outlet port 26 to a plasma torch system. The pressure actuator 20 is also mechanically linked to the pilot chamber 18 and the dump valve 25. When the pilot pressure in the pilot chamber is less than a predetermined value, the dump valve 25 is opened to exhaust the gas flow out through the exhaust port 28.

The first embodiment can employ two similar on/off solenoid valves to control the pressure in the pilot chamber 18. The pilot fill valve 14 can be a normally-closed valve and the pilot dump valve 16 can be normally-open. The pressure actuator can include a piston 27 that forms the floor of the pilot chamber 18. The pressure actuator mechanism 20, located below the pilot chamber, is mechanically linked to two opposing valves. The gas regulator 23 acts as the main regulator responsible for the forward flow, whereas the dump valve 25 provides for rapid exhaust. In some embodiments, the gas regulator and the dump valve can be poppet valves or mushroom valves. The pressure actuator mechanism 20 can connect both of these valves to the piston 27 by a shaft 29. In the illustrated embodiment, any change in pressure of the pilot chamber is communicated to the valves by the shaft 29 and piston 27.

To initially charge the system, the pilot fill valve 14 is turned on to pressurize the pilot chamber 18. Then, in some embodiments, both the fill and dump pilot valves are pulsed until the output pressure, which may be monitored by a pressure sensor, rises and stays within a tolerance range relative to the desired set point. A control algorithm can determine the pulse widths required to achieve the set point. Once this state is reached, both pilot valves are closed. As long as the output pressure is maintained within the tolerance range, the valves are not pulsed, which can extend the usable life of the regulator. If there is any drift from the set-point tolerance range, the valves are pulsed again to compensate.

To empty the pilot chamber 18, the pilot fill valve 14 is closed and the pilot dump valve 16 is opened. This can result in total loss of pressure in the pilot chamber 18 which triggers the dump valve 25 in the body to open and vent all the downstream pressure.

When the dump valve is in a normally-open design it provides fail safe protection and prevents the regulator from turning on automatically if there is any residual pressure in the pilot chamber (for example, from leakage through the fill valve or through the manifold).

Figure 3:
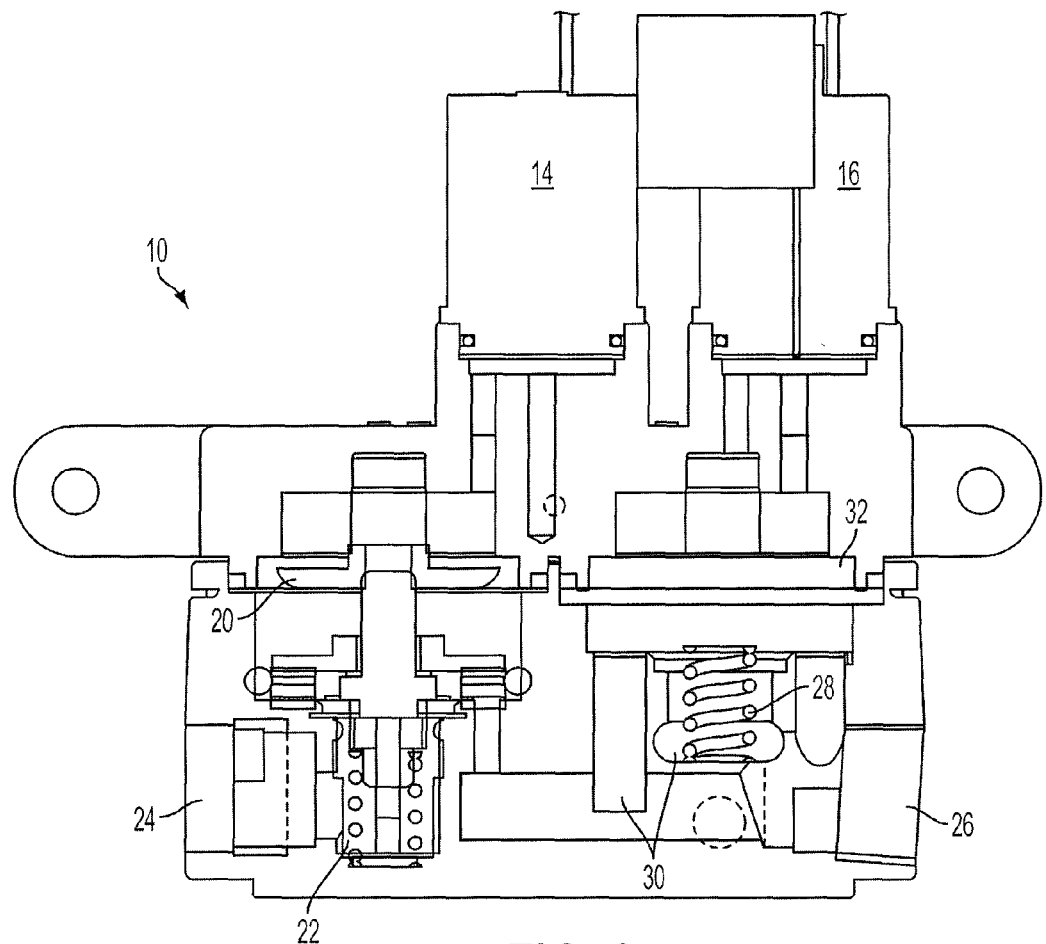
FIG. 3 shows an embodiment of a pressure regulator that includes two proportional control valves that are part of a pneumatic relay.

In some embodiments, the pilot chamber 18 can be mechanically coupled to two or more pressure actuators that control two or more valves. In FIG. 3, the two valve design includes several parts, including, the body 10, the pilot chamber 18, and the secondary dump valve 28. The pilot chamber 18 on top of the body 10 is coupled to the pilot fill valve 14 and the pilot dump valve 16. The pilot chamber can be coupled to two independent pressure actuators 20, 32. One pressure actuator 20 can control the actuation of the regulator valve and the other pressure actuator 32 can be used to rapidly dump the system pressure using the secondary dump valve 28.

The positioning of the pilot fill valve 14 and pilot dump valve 16 can both be identical (for instance normally closed) or different (for instance the fill valve can be normally closed and dump can be normally open). In one embodiment, the pilot fill valve 14 is normally closed and the pilot dump valve 16 is normally open. This can be, for example, when power is lost so the system returns to its normal, or off, state. The pilot fill valve and the pilot dump valve can be a proportional valve, a solenoid valve, or an on/off valve. Also both the pilot fill and dump valves can have slightly different flow and hysteresis characteristics. Proportional control valves typically exhibit hysteresis.

To charge the line, the system turns off ("closes") the dump valve 16, and opens the fill valve 14 with a certain amount of gas.

The system can measure the outlet pressure continuously through a pressure sensor 34 connected to the outlet 26 on the body 10. The system can use this pressure information to close the control loop and adjust the current flowing in both fill and dump valves to maintain the desired set-point gas pressure.

When the set-point pressure is within a predetermined tolerance range, both the valves can be closed so that the pilot pressure is maintained at a constant pressure. When the outlet pressure moves outside the tolerance range, one of the valves can be actuated to correct the system pressure setting.

To exhaust the line and torch, (i.e., perform a 'dump'), the system can turn off the fill valve 14 and completely open the dump valve 16 to enable the gas to escape.

The secondary dump valve can be driven pneumatically. The secondary dump valve pressure actuator 32 can be connected to the pilot chamber 18. The secondary dump valve 28 can be designed to open when the difference in pressure between the pilot chamber 18 and the outlet pressure exceeds a certain value, for example, approximately 8-10 psi. When the dump valve 16 is fully opened, the pressure in the pilot chamber 18 drops rapidly (i.e, faster than the regulator can follow). This causes the secondary dump valve 28 to open. When it opens, it provides a high flow exhaust path for the gas in the line and torch.

The dump valve 16 can be in a normally open design and provides fail safe protection as well as prevents the regulator from turning on automatically if there is any residual pressure in the pilot chamber, typically from leakage through the fill valve or through a manifold.

The dump valve 16 can also be designed to be open when power is removed (i.e., normally open). This provides two features in the absence of power: The first feature is that if power fails, the pilot chamber 18 is vented, and this triggers the secondary dump valve 28 to open, depressurizing the line and torch and preventing air consumption when the power is off. The second feature is that in the event the power is off and the fill valve leaks gas, the pressure in the pilot chamber cannot increase and cause the regulator to start flowing. This limits air consumption to value of the leak pressure when the system is off.

The pressure regulator can be used in a number of implementations. In some embodiments, the valves are on/off pilot valves but the valves have different flow characteristics. In some embodiments, the regulator is not a 1:1 design but has a ratio of approximately 4.5:1. This means that the regulated outlet pressure is approximately 4.5 times the control chamber pressure.

The pressure regulator 10 can house the main regulator valve 22 and the pneumatically driven secondary dump valve 28 which communicates to the pilot chamber 18 through a set of pressure actuators 32. The change in the pilot chamber pressure is communicated to the valves in the body 10 through the pressure actuators 32.

To initially charge the system, the fill valve 14 is opened to pressurize the pilot chamber 18. Then both the fill 14 and dump pilot valves 16 are pulsed until the output pressure (for example, monitored by a pressure sensor) is within a tolerance range surrounding the desired set point. The control algorithm determines the pulse widths required to achieve the set point. Once this state is reached, both the fill 14 and dump valves 16 can be closed. As long as the output pressure is maintained within the tolerance range, the pilot valves are not pulsed, which can extend the life of the regulator. If there is any drift from the set-point tolerance range, the valves are pulsed again to compensate.

To dump gas from the system, both the fill valve 14 is closed and the dump valve 16 is opened. This will result in total loss of pressure in the pilot chamber 18, which triggers the dump valve 28 in the body to open and vent all the downstream pressure.

Figure 4:
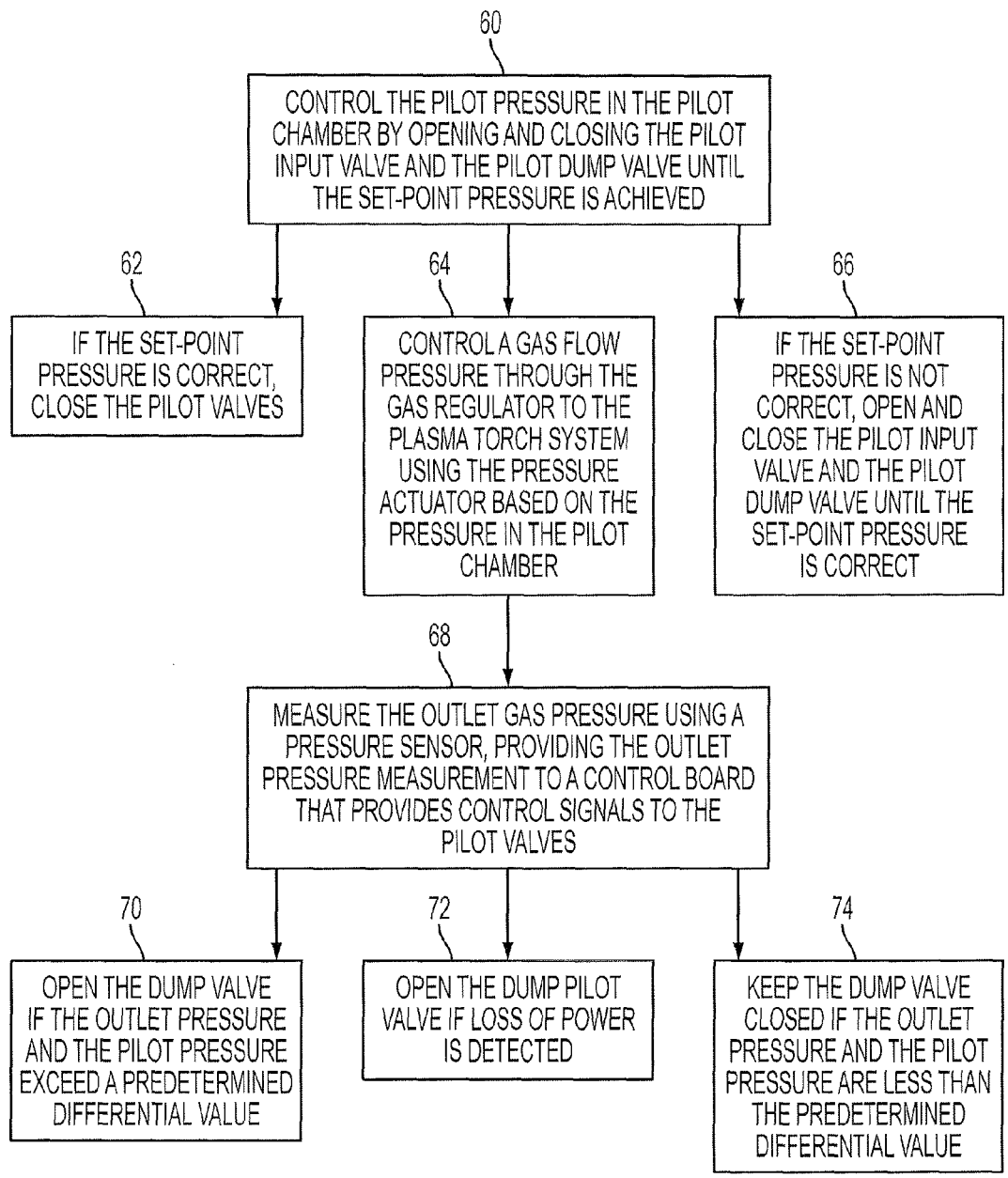
FIG. 4 illustrates a method of utilizing the disclosed pressure regulators as part of a plasma torch system.

The technology can also include a method of controlling a pressure regulator in a plasma torch system. In one embodiments of the method, for example FIG. 4, the pilot pressure in the pilot chamber is controlled (60) by opening a closing the pilot input valve and the pilot dump valve until a set-point pressure is achieved. In some embodiments, the valves are pulsed open and close. The gas flow through the gas regulator to the plasma torch system is controlled using the pressure actuator which is affected by the pressure in the pressure chamber (64). Once the correct set-point pressure is reached, the pilot valves are closed (62). If the set-point pressure is not achieved, the pilot fill valve and the pilot dump valve are opened and closed until the set point pressure is correct (66). Once the set-point pressure is reached in the pilot chamber, and the pressure regulator is controlling the gas flow pressure, the outlet gas pressure is measured using a sensor (68). A signal indicating the outlet pressure is then provided to a control board that provides control signals to the pilot valves. In this way the pressure in the pilot chamber is continuously updated and monitored, such that any adjustments or changes can be made as necessary to the pressure in the pilot chamber, and as a result the gas flow pressure is controlled. In some embodiments, the gas flow to the plasma torch can be evacuated quickly by opening the dump valve 28. In some embodiments, the dump valve 28 can be driven pneumatically. The secondary dump valve pressure actuator 32 can be connected to the pilot chamber 18. The secondary dump valve can be designed to open when the difference in pressure between the pilot chamber and the outlet pressure exceeds a certain value, for example, approximately 8-10 psi (70). When the dump valve 16 is fully opened, the pressure in the pilot chamber 18 drops rapidly (i.e, faster than the regulator 22 can follow). This causes the secondary dump valve 28 to open. When it opens, it provides a high flow exhaust path for the pressure in the line and torch. Alternatively, if the pressure differential between the pilot chamber and the outlet pressure are lower than a predetermined value, the secondary dump valve 28 will remain closed. In some embodiments, if a loss of power is detected, the pilot dump valve will open (72). This then causes the pilot chamber to evacuate and similarly activates the secondary dump valve 28 to open, thereby evacuating the gas flow to the plasma torch.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated.

What is claimed is:

1. A method of regulating a gas flow of a plasma arc system having a gas regulator that controls gas flow from a gas source to the plasma torch system, a pilot input valve to fill a pilot chamber and a pilot dump valve to evacuate the pilot chamber, the pilot chamber mechanically coupled to the gas regulator through a pressure actuator mechanism, the method comprising:
   filling the pilot chamber by opening the pilot input valve to raise the pressure level in the pilot chamber;
   controlling the pilot pressure in the pilot chamber by opening and closing the pilot input valve and the pilot dump valve;
   controlling a gas flow or gas pressure through the gas regulator to the plasma torch system using the pressure actuator mechanism based on the pressure in the pilot chamber;
   opening a pilot dump valve to evacuate the pilot chamber and decrease or shut off the gas flow to the plasma torch system when electrical power is lost.

2. A plasma torch regulator comprising:
   a pilot chamber with a pilot input valve and a pilot dump valve;
   a gas regulator having a gas input port and a gas outlet port;
   a dump valve having an exhaust port;
   a pressure actuator mechanism that mechanically links the pilot chamber and the gas regulator such that the pressure actuator mechanism reacts to a pilot pressure in the pilot chamber and establishes an outlet gas flow that the gas regulator allows to flow through the gas outlet port to a plasma torch system; and a dump actuator mechanism that mechanically links the pilot chamber and the dump valve such that when the pilot pressure in the pilot chamber is less than a predetermined value, the dump valve is opened to exhaust the outlet gas flow out through the exhaust port.

3. The system of claim 2 wherein the pressure actuator mechanism and the dump actuator mechanism are a diaphragm or a piston.

4. The system of claim 2 wherein the pilot input valve and the pilot dump valve are proportional control valves.

5. The system of claim 2 wherein pilot input valve and the pilot dump valve are on/off valves.

6. The system of claim 2 wherein the pilot fill valve and the pilot dump valve are opened and closed based on controlled signals from a control board.

7. The system of claim 6 wherein the control board receives feedback signals from a sensor that measures the outlet gas flow pressure.

8. The system of claim 2 wherein the pilot fill valve is normally closed and the pilot dump valve is normally open.

9. The system of claim 2 wherein the pressure actuator mechanism and the dump actuator mechanism are the same mechanism.

10. A method of regulating a gas flow of a plasma torch system having a gas regulator that controls gas flow from a gas source to the plasma torch system, a pilot input valve to fill a pilot chamber and a pilot dump valve to evacuate the pilot chamber, the gas regulator mechanically coupled to the pilot chamber through a pressure actuator mechanism, a dump valve that allows for exhaust of the gas in the plasma torch system, the dump valve mechanically coupled to the pilot chamber through a dump actuator mechanism, the method comprising:

filling the pilot chamber by opening the pilot input valve to raise a pilot pressure in the pilot chamber;

controlling the pilot pressure in the pilot chamber by opening and closing the pilot input valve and the pilot dump valve;

controlling a gas flow or a gas pressure of the gas flow through the gas regulator to the plasma torch system using the pressure actuator mechanism based on the pressure in the pilot chamber;

measuring an output gas pressure;

comparing the output gas pressure to a command pressure;

controlling an exhaust gas flow from the plasma torch through the dump valve using the dump actuator mechanism when the command pressure is less than the output gas pressure.

11. The method of claim 10 wherein the filling step further comprises closing the dump valve.

12. The method of claim 10 further comprising measuring the gas pressure to the plasma torch system through a pressure sensor.

13. The method of claim 12 further comprising controlling the output gas pressure based on comparing the output pressure to the command pressure.

14. A plasma torch regulator comprising:

a pilot chamber with a pilot input valve and a pilot dump valve, the pilot input valve having a closed position that inhibits gas flow through a pilot valve body and an open position that allows gas flow through the pilot valve body, the pilot input valve configured to be in the closed position in the absence of a signal, the pilot dump valve having a closed position that inhibits gas flow through a pilot dump valve body and an open position that allows gas flow through the pilot dump valve body, the pilot dump valve configured to be in the open position in the absence of a signal;

a gas regulator having a gas input port and a gas outlet port;

a dump valve having an exhaust port, the dump valve having a closed position that inhibits gas flow from the plasma gas torch through a dump valve body and an open position that allows gas flow from the plasma torch through the dump valve body, the pilot dump valve configured to be in the open position in the absence of a signal;

a pressure actuator mechanism that mechanically links the pilot chamber and the gas regulator such that the pressure actuator mechanism reacts to a pilot pressure in the pilot chamber and establishes an outlet gas flow that the gas regulator allows to flow through the gas outlet port to a plasma torch system and also mechanically links the pilot chamber and the dump valve such that when the pilot pressure in the pilot chamber is less than a predetermined value, the dump valve is opened to exhaust the outlet gas flow out through the exhaust port.

* * * * *